United States Patent
Terada (10) Patent No.: US 6,329,663 B1
(45) Date of Patent: Dec. 11, 2001

(54) METHOD AND APPARATUS FOR CLEANING A GLASS SUBSTRATE FOR A COLOR FILTER

(75) Inventor: Kazuo Terada, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/286,072

(22) Filed: Apr. 5, 1999

(30) Foreign Application Priority Data

Apr. 28, 1998 (JP) .................................. 10-118704

(51) Int. Cl.$^7$ ..................................... B08B 7/00
(52) U.S. Cl. .......................... 250/492.1; 134/1.1
(58) Field of Search ............... 250/492.1, 504 R; 134/1.1; 118/50.1, 724; 156/345

(56) References Cited

U.S. PATENT DOCUMENTS

| | | | |
|---|---|---|---|
| 4,904,328 | * | 2/1990 | Beecher et al. .................... 156/272.2 |
| 4,987,008 | * | 1/1991 | Yamazaki et al. .................. 427/53.1 |
| 6,098,637 | * | 8/2000 | Parke ..................................... 134/1.1 |

\* cited by examiner

*Primary Examiner*—Kiet T. Nguyen
(74) *Attorney, Agent, or Firm*—Scully, Scott, Murphy & Presser; Marian Underweiser, Esq.

(57) ABSTRACT

According to the invention, a cleaning method and a cleaning apparatus are disclosed for removing organic contaminants on a surface of a color filter without damaging pigment portions of the color filter. The cleaning is performed by using a source of ultraviolet radiation having a wavelength equal to or less than 180 nm (most preferably a wavelength of 172 nm), which does not transmit through the transparent electrodes (e.g., ITO film, IZO film or the like), thereby protecting the pigment portions of the color filter. As a result, the glass substrate can be cleaned by the ultraviolet radiation without discoloring the pigment portions of the color filter and the cleaning effect is increased because the exposure time to the ultraviolet radiation is not limited.

15 Claims, 6 Drawing Sheets

Result of Experiment Showing Discoloring of Color Filter by Exposing to UV of 172 nm (Without ITO Film)

Figure 3

Result of Experiment Showing Discoloring of Color Filter by Exposing to UV of 172 nm (With ITO Film)

Cross Section of Color Filter

Figure 7

METHOD AND APPARATUS FOR CLEANING A GLASS SUBSTRATE FOR A COLOR FILTER

BACKGROUND OF THE INVENTION

1. Technical Field

The present invention relates to a cleaning method and a cleaning apparatus for cleaning a glass substrate with a color filter. More particularly, the present invention relates to a cleaning method and a cleaning apparatus for cleaning a glass substrate with a color filter including a pattern of transparent electrode, which is made of ITO (indium tin oxide: an alloy of indium oxide and tin oxide) or IZO (an alloy of indium oxide and zinc oxide), or the like, and which is formed on a pigment pattern. Yet more particularly, the present invention relates to a cleaning method and a cleaning apparatus for cleaning a glass substrate with a color filter, which can remove an organic contaminant on the ITO or IZO film by exposure to ultraviolet radiation.

2. Prior Art

A portable personal computer (PC) called as a laptop type or a notebook type has been developed, fabricated and widely used with the recent advance of technology. Generally, these portable computers use various display devices utilizing liquid crystal, electroluminescent (EL), plasma, etc. for the reason that these display devices are thin, light weight and low power consumption and does not prevent the portability of the computer.

This type of display device includes glass substrates on which the electrodes are formed as a major component. For example, the liquid crystal display device includes two glass substrates and a liquid crystal material filled in a space between the two substrates. The pattern of the electrodes is formed on a surface of the substrate which faces the liquid crystal material to apply an electric field to the liquid crystal material. In the case of the color liquid crystal display device, a color filter is formed on the upper glass substrate of the two glass substrates. In this case, the transparent electrodes are formed to cover the surfaces of pigment portions for displaying a red (R) color, a green (G) color and a blue (B) color. An alloy, such as ITO (indium tin oxide: an alloy of indium oxide and tin oxide) or IZO (an alloy of indium oxide and zinc oxide), is generally used as the transparent electrode. For example, the transparent electrode of the ITO film is formed by depositing In-Sn metal on the glass substrate and annealing them to oxidize them.

Figure 8:
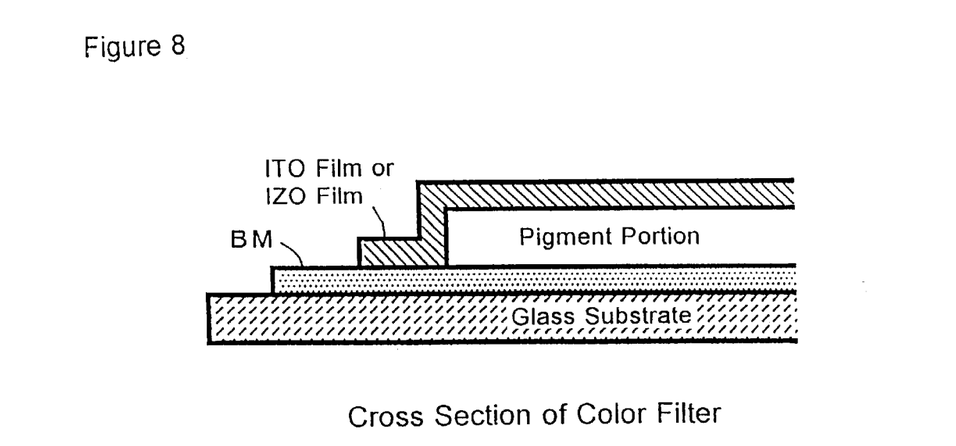
FIG. 8 shows the cross section of the color filter.

FIG. 8 shows a cross section of the glass substrate and the color filter. As shown in the FIG. 8, a film of a black matrix (BM) and the pigment portion are formed on the glass substrate in this order. The glass substrate is made of alkali-free borosilicate glass or quartz glass of the thickness of 0.7 mm. The pigment portion has the one of the colors R, G and B, and its upper surface is covered by the transparent electrode, such as the ITO film, of the thickness of 1500±200 Å. The BM layer, such as a Cr layer, is formed underside of the color filter layer to shut off the radiation illuminated on a portion other than an effective portion of a picture element for emphasizing the black to improve the contrast ratio, as well known in the art.

Undesired organic material, such as dye, tends to adhere or stick on the glass substrate. If the organic contaminant adheres on the glass substrate, undesired problems, such as a change in quality of the liquid crystal sandwiched between the glass substrates, a generation of defects in the displayed image may be occurred. To prevent these problems, it is necessary to keep the glass substrates having the transparent electrodes, such as the ITO film, the IZO film, formed thereon in a clean condition in the fabrication process.

It has been broadly known in the art that a cleaning using the ultraviolet radiation is effective to remove the organic material. The cleaning process is performed by a mechanism that activated oxygen is generated by a photochemistry action of the ultraviolet radiation, i.e. the exposing to the ultraviolet radiation, and the organic material is oxidized by the action of the activated oxygen and changes to volatile molecules.

In the case of the cleaning of the organic material by exposing to the ultraviolet radiation, however, the necessary organic material, which should not be removed, on the substrate is quite capable of being damaged along with the unnecessary organic material since the entire surface of the glass substrate is exposed to the ultraviolet radiation.

Only the cleaning apparatus for cleaning the glass substrate which uses a low pressurized mercury lamp having an output wavelength of 254 nm has been widely used in the fabrication lines. The ultraviolet radiation having the relatively long wavelength of 254 nm can transmit through the transparent electrode layer, such as the ITO film, the IZO film etc. The ultraviolet radiation transmitting through the transparent electrode layer exerts a bad influence, such as a discoloring on the pigment portions to degrade the function of the color filter along with the removal of the unnecessary organic material. To solve this problem, the exposing time is shortened in the cleaning using the ultraviolet radiation. However, the shortening of the exposing time ills arises a new problem of insufficient cleaning. An easygoing way of thinking is possible which uses the ITO film or the IZO film of a large thickness to protect the pigment pattern from being exposed to the ultraviolet radiation. However, the thickness of the ITO film or the IZO film must be in the range of 1300 Å~1700 Å due to the requirement to raise the transmittance of the ITO film or the IZO film.

One of the object of the present invention is to provide an excellent cleaning method and a cleaning apparatus for cleaning a glass substrate with a color filter.

Another object of the present invention is to provide an excellent cleaning method and a cleaning apparatus for cleaning a glass substrate with a color filter including a pattern of transparent electrode, made of ITO (indium tin oxide: an alloy of indium oxide and tin oxide) or IZO (an alloy of indium oxide and zinc oxide), etc., is formed on a pigment pattern.

Another object of the present invention is to provide an excellent cleaning method and a cleaning apparatus for cleaning a glass substrate with a color filter which can effectively remove the organic contaminant deposited on the ITO film or the IZO film by exposing to ultraviolet radiation.

SUMMARY OF THE INVENTION

The present invention solves the above-identified problems. The present invention is directed to a method for cleaning a glass substrate with a color filter including a pattern of transparent electrode formed on a pigment pattern, which comprises exposing the glass substrate to ultraviolet radiation so as to remove an organic contaminant on the glass substrate, the ultraviolet radiation having a wavelength not transmitting through the transparent electrode.

The transparent electrode can be made of an ITO film (made from an alloy of indium oxide and tin oxide), an IZO film (made from an alloy of indium oxide and zinc oxide) or the like.

More specifically, the method of the present invention comprises exposing the glass substrate to ultraviolet radiation having a wavelength of 180 nm or less, and most preferably to a wavelength of 172 nm.

The present invention is further directed to an apparatus for cleaning a glass substrate with a color filter including a pattern of transparent electrode formed on a pigment pattern, comprising: a chamber for maintaining a predetermined atmosphere; a supporting structure for holding the glass substrate thereon; a light source for emitting ultraviolet radiation having a wavelength not transmitting through the transparent electrode; and an ozone filter and an ozone sensor for disposing of ozone which is generated during the emission of the ultraviolet radiation.

More particularly, the apparatus in accordance with the present invention comprises a light source for emitting ultraviolet radiation having a wavelength of 180 nm or less, and more specifically a wavelength of 172 nm.

A supporting structure may include a horizontal movement mechanism for positioning the glass substrate in a horizontal direction and an up/down mechanism for aligning the glass substrate to expose the glass substrate to the ultraviolet radiation.

An apparatus for cleaning a glass substrate with a color filter may include a carry in conveyer for carrying the glass substrate into the chamber and a carry out conveyer for carrying the glass substrate out of the chamber.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

The present invention relies upon a physical and an optical characteristics of the transparent electrodes, such as the ITO, IZO, etc., which are obtained based upon the experimental data found by the inventor of the present invention.

In accordance with the experiments performed by the inventor, it has been found that the ultraviolet radiation having the wavelength equal to or less than 180 nm does not transmit through the transparent electrodes, such as the ITO film, the IZO film, etc., as later described. Accordingly, if the cleaning process is performed by using the source of ultraviolet radiation having the output radiation of the wavelength (such as 172 nm) equal to or less than 180 nm, the pigment portions of the color filter can be protected by the ITO film or the IZO film. As a result, the glass substrate can be cleaned by exposing to the ultraviolet radiation without the bad influence to the pigment portions of the color filter, such as the discoloring. The cleaning effect is also increased since it is not required to limit the exposing time to the ultraviolet radiation.

The embodiment of the present invention is described with reference to the drawings.

As described above, the present invention relies upon the physical and optical characteristics of the transparent electrodes, such as the ITO, IZO, etc., which are obtained based upon the experimental data found by the inventor of the present invention. First, the experimental data are referred before describing the embodiment.

Figure 1:
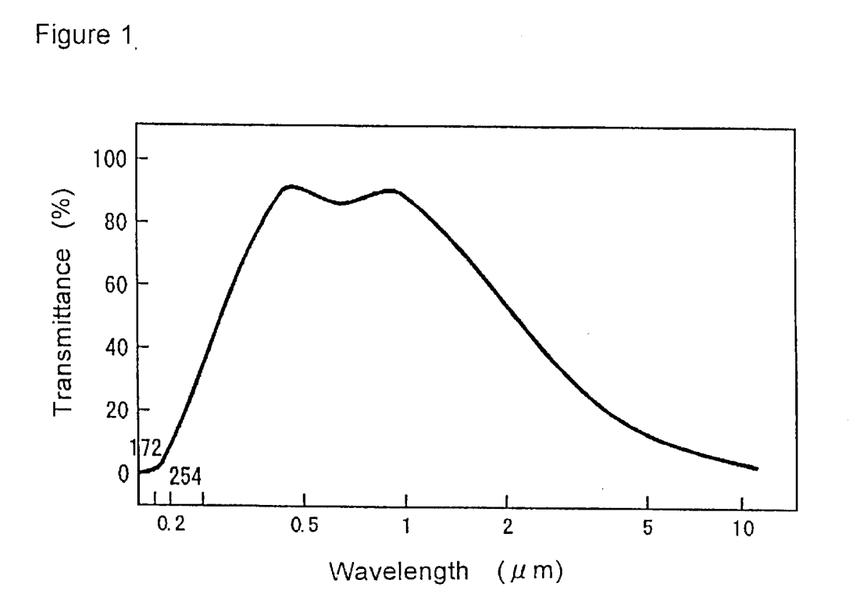
FIG. 1 shows a graph which shows that the transmittance of the indium oxide ($In_2O_3$) film relies upon the wavelength.

FIG. 1 shows a graph which shows that the transmittance of the indium oxide ($In_2O_3$) film varies in depending upon the wavelength, wherein a horizontal axis shows the wavelength (m) of the ultraviolet radiation being exposed to and a vertical axis shows the transmittance (%). As apparent from the FIG. 1, in the range of wavelength equal to or less than 180 nm, the transmittance of the indium oxide film is substantially equal to 0%. For example, in the case that the color filter is exposed to the ultraviolet radiation of the wavelength 172 nm and an irradiance at the light source of 28.8 ($mW/cm^2$), the transmittance at a portion of the quartz glass on which the indium oxide film is not formed is 94.5%, while the transmittance at a portion of the quartz glass on which the indium oxide film is formed is 0%.

Figure 2:
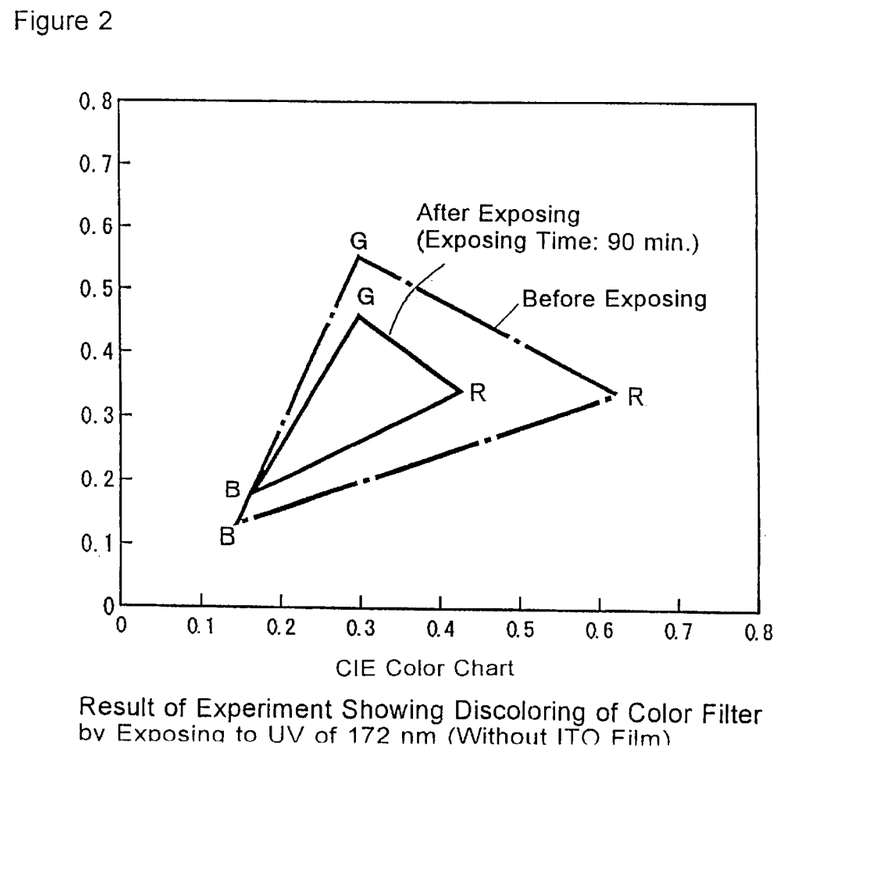
FIG. 2 shows the influence of the exposing to the ultraviolet radiation on the chromaticity of the pigment portions which is not protected by the indium oxide film.
Figure 3:
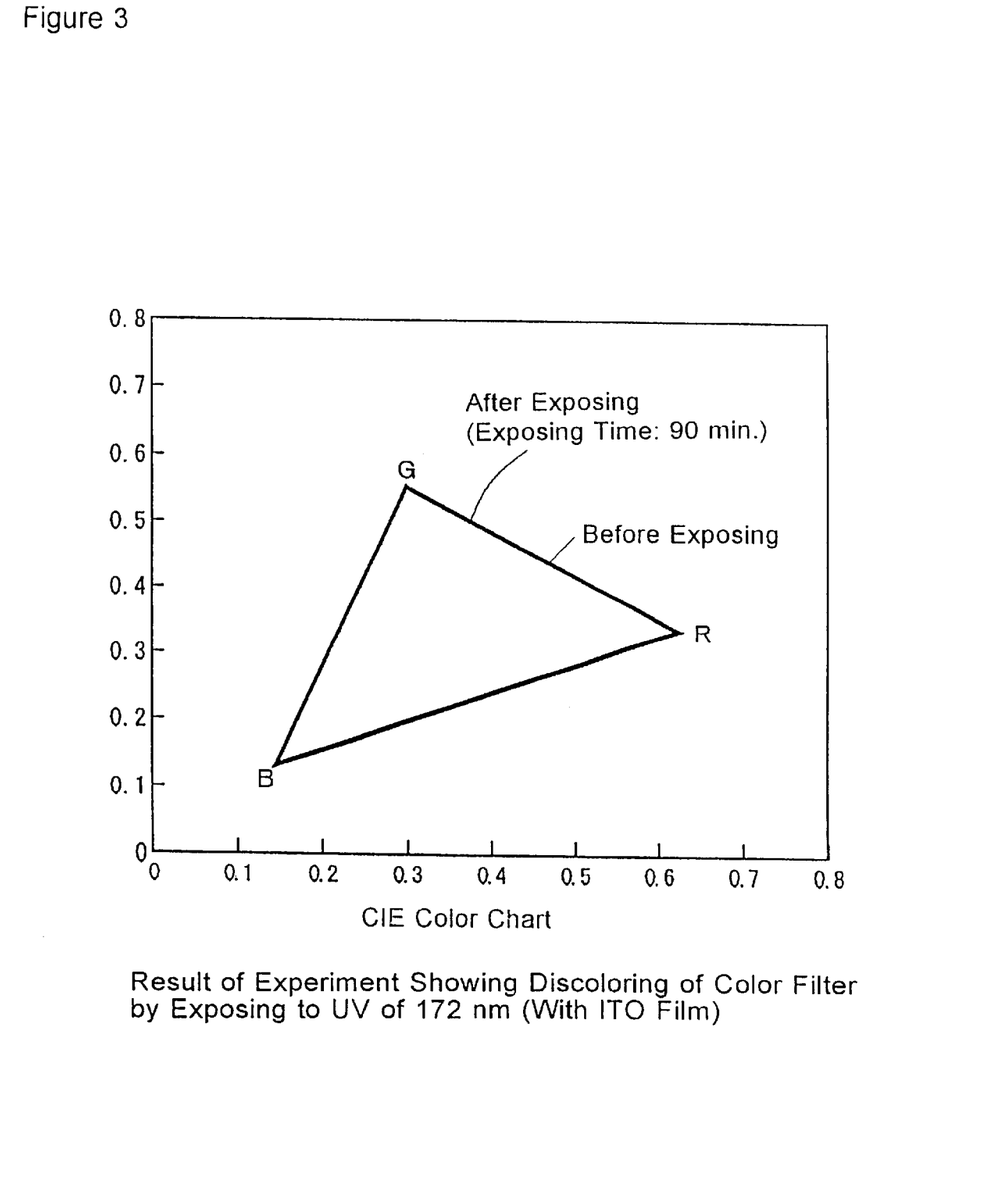
FIG. 3 shows the influence of the exposing to the ultraviolet radiation on the chromaticity of the pigment portions which is protected by the indium oxide film.

FIG. 2 shows the influence of the exposing to the ultraviolet radiation on the chromaticity of the pigment portions which is not protected by the indium oxide film. FIG. 3 shows the influence of the exposing to the ultraviolet radiation on the chromaticity of the pigment portions which is protected by the indium oxide film. The ultraviolet radiation has the wavelength of 172 nm, and the exposing time is 90 minutes. The thickness of the indium oxide film is 1500±200 Å. In the case that the indium oxide film is not provided, the remarkable discoloring is observed at each of the pigment portions of R, G and B, as shown in the FIG. 2. It can be considered that the change or degradation of the characteristic of each color of the pigment portions is caused by an etching phenomena generated by directly exposing to the ultraviolet radiation. In the case that the indium oxide film is provided, the discoloring is not observed, as shown in the FIG. 3. The reason for realizing this result is that the pigment portions are protected by the indium oxide film which does not transmit the ultraviolet radiation of the wavelength of 172 nm.

Figure 4:
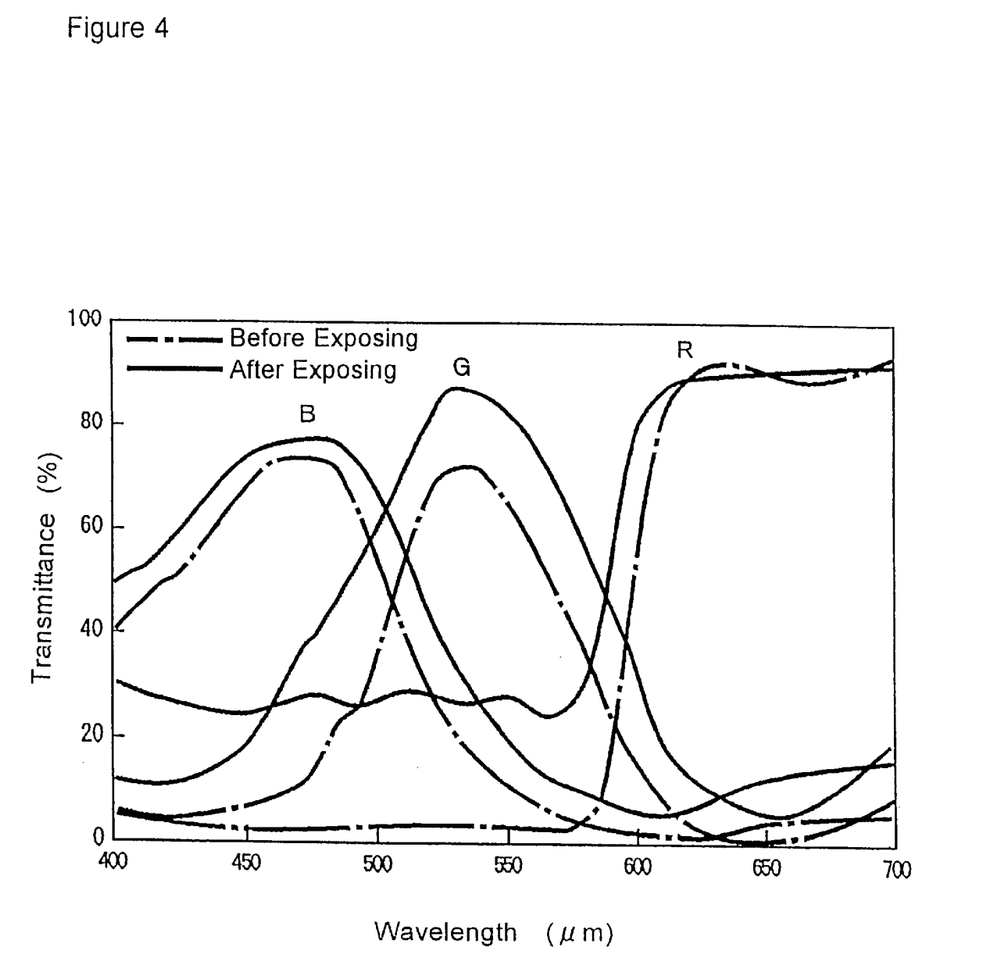
FIG. 4 shows the influence of the exposing to the ultraviolet radiation on the spectral characteristic of the pigment portions which is not protected by the indium oxide film.
Figure 5:
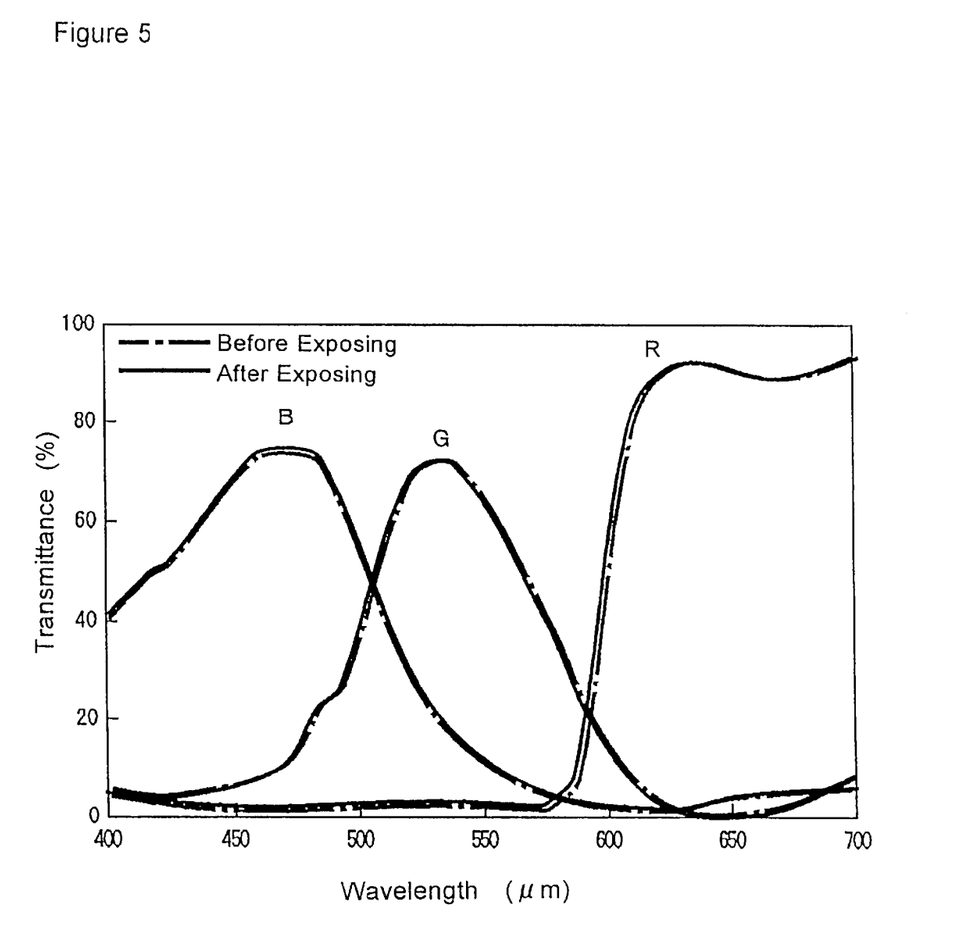
FIG. 5 shows the influence of the exposing to the ultraviolet radiation on the spectral characteristic of the pigment portions which is protected by the indium oxide film.

FIG. 4 shows the influence of the exposing to the ultraviolet radiation on the spectral characteristic of the pigment portions which is not protected by the indium oxide film. FIG. 5 shows the influence of the exposing to the ultraviolet radiation on the spectral characteristic of the pigment portions which is protected by the indium oxide film. The ultraviolet radiation has the wavelength of 172 nm, and the exposing time is 90 minutes. The thickness of the indium oxide film is 1500±200 Å. In the case that the indium oxide film is not provided, the remarkable change in the spectral characteristic is observed at each of the pigment portions of R, G and B, as shown in the FIG. 4. It can be considered that the change or degradation of the characteristic of each color of the pigment portions is caused by an etching phenomena generated by directly exposing to the ultraviolet radiation. In the case that the indium oxide film is provided, the change in the spectral characteristic is not observed, as shown in the FIG. 5. The reason for realizing this result is that the pigment portions are protected by the indium oxide film which does not transmit the ultraviolet radiation of the wavelength of 172 nm.

It is apparent from the above description with reference to the FIGS. 1–5 that the transparent electrodes, such as the indium oxide film, prevents the transmission of the ultraviolet radiation having the wavelength equal to or less than 180 nm, so that such transparent electrodes protect the underlying pigment portions. The wavelength of 172 nm is used in the FIGS. 1–5 as one example. Accordingly, if the cleaning process is performed by using the source of ultraviolet radiation having the output radiation of the wavelength (such as 172 nm) equal to or less than 180 nm, the pigment portions can be protected by the transparent electrodes, but the unnecessary organic material can be removed. As a result, the present invention realizes the remarkable meritorious effects that the discoloring and the change of the spectral characteristic are not generated in the pigment portions, and that the ultraviolet radiation can be irradiated or directed onto the unnecessary organic material for a sufficient time period to completely remove them.

Figure 6:
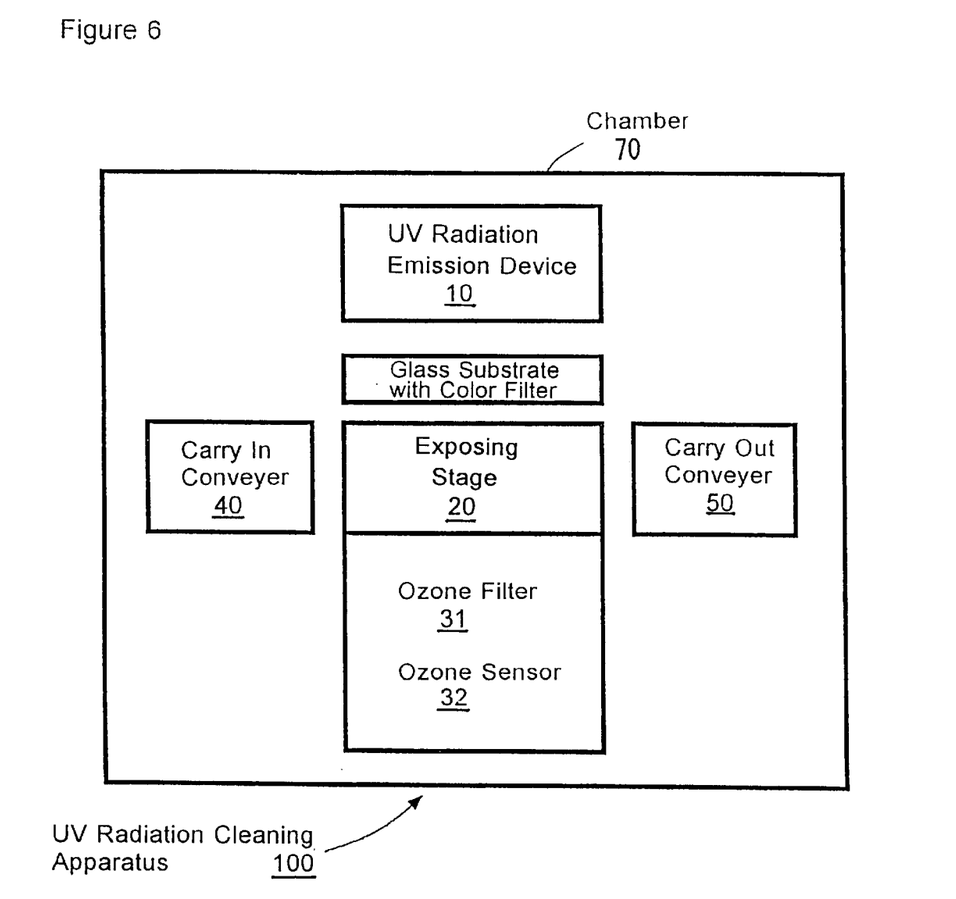
FIG. 6 schematically shows a structure of a cleaning apparatus 100 using the ultraviolet radiation for realizing the concepts of the present invention.

FIG. 6 schematically shows a structure of the ultraviolet radiation cleaning apparatus 100 for realizing the concepts of the present invention. This cleaning apparatus 100 using the ultraviolet radiation is designed to clean the glass substrate with the color filter.

As shown in the FIG. 6, the cleaning apparatus 100 using the ultraviolet radiation includes an ultraviolet (UV) radiation emission device 10 which is an emission source of the ultraviolet radiation directed to the glass substrate, an exposing or support stage 20 which holds the glass substrate at the exposing position, an ozone filter 31 and an ozone sensor 32 which are used for filtering the ozone generated by the emission of the ultraviolet radiation, a carry in conveyer 40 which carries the glass substrate to be cleaned onto the exposing stage 20, a carry out conveyer 50 which carries the cleaned glass substrate out of the exposing stage 20, and a chamber 70 which covers the above components.

The ultraviolet radiation emission device 10 emits the ultraviolet radiation output to direct it onto the glass substrate positioned to face the device 10. The photochemistry action is promoted at the surface of the exposed glass substrate, and the unnecessary organic material on the surface is removed. More particularly, the activated oxygen, i.e. the excited oxygen atoms, and the ozone are generated by the reaction of the ultraviolet radiation with the oxygen molecules in the atmosphere. The organic material on the exposed surface is oxidized by the action of the activated oxygen and is changed to the volatile molecules, so that the organic material deposited on the surface is released and removed.

The cleaning mechanism itself by the exposing to the ultraviolet radiation has been known in the art. The important feature or concept of the present invention is that the wavelength of the ultraviolet radiation emitted from the ultraviolet radiation emission device 10 is limited to the wavelength equal to or less than 180 nm. As described before, the transparent electrodes, such as the indium oxide film, has the characteristic which shuts off the ultraviolet radiation of the wavelength equal to or less than 180 nm and protects the underlying pigment portions from the ultraviolet radiation. Accordingly, if the cleaning process is performed by using the source of ultraviolet radiation having the output radiation of the wavelength equal to or less than 180 nm, the pigment portions can be protected by the transparent electrodes, but the unnecessary organic material can be removed. As a result, the discoloring and the change of the spectral characteristic are not generated in the pigment portions, and the ultraviolet radiation can be illuminated or directed onto the unnecessary organic material for a sufficient time period to completely remove them.

One example of the light source in the marketplace for emitting only the ultraviolet radiation of the wavelength equal to or less than 180 nm is an apparatus fabricated by Ushio Electric Corp., Tokyo, Japan, and this apparatus generates the output wavelength of 172 nm. As the light sources used as a standard light source or a light source in the experimental level, a D2 lamp (heavy hydrogen), an Argon lamp, a Krypton lamp, etc. can be listed. However, at the time of the application of the present invention, the output powers of these lamps are low, and the illumination area or scope of these lamps is narrow, so that it is difficult to use these lamps in the cleaning process of the present invention. The wavelength of the light source depends upon a type of gas in the discharge space and a gas temperature (a plasma temperature). The light source of the Ushio Electric Corp. is fulled with Xenon, but it differs from the so-called Xenon lamp. The plasma temperature is related to a structure of the electrode for generating the plasma.

The exposing stage 20 fixedly holds the glass substrate to position the glass substrate at the exposing position. More particularly, the exposing stage 20 includes a suction mechanism for generating a suction force to fix the glass substrate supplied through the carry in conveyer 40, a XY table for positioning the glass substrate at a desired position in the horizontal plane, and a Z table for moving the stage 20 in an up and down direction to position the glass substrate at an exposing position to the ultraviolet radiation. The detail of the suction mechanism and the X, Y and Z tables are not described herein since these are well known in the art.

The ozone filter 31 and the ozone sensor 32 are mounted in the chamber 70 to process the ozone generated by the emission of the ultraviolet radiation. When the ultraviolet radiation is emitted in the atmosphere, the ozone is generated along with the activated oxygen, i.e. the excited oxygen atoms, as well known in the art. The cleaning is performed by decomposing the organic material by the activated oxygen, and the ozone remains in the chamber (equation: $O_2 \rightarrow O_3 \rightarrow O_2 + O$). Since the ozone is harmful to health, as well known in the art, the ozone is decomposed by the ozone filter 31, and the decomposed material is exhausted from the ultraviolet radiation cleaning apparatus 100, in view of a safety and sanitation. The ozone sensor 32 is provided to monitor the ozone concentration in the chamber 70. The ozone filter 31 and the ozone sensor 32 well known in the art can be used, and since the process for exhausting the ozone does not constitute the present invention, the detail is not described.

The carry in conveyer 40 is provided to carry the glass substrate to be cleaned into the chamber 70, and the carry out conveyer 50 is provided to carry the cleaned glass substrate out of the chamber 70. Since these conveyers 40 and 50 are well known in the art and does not constitute the present invention, the detail is not described.

The chamber 70 functions to temporarily isolate the cleaning atmosphere from the outside atmosphere. In the ultraviolet radiation cleaning process, the ozone, carbon dioxide and water are generated by dissipating the oxygen in the atmosphere. To this end, it is necessary to keep the atmosphere within the chamber 70 clean. That is, it is necessary to dispose the generated ozone and to exhaust the resulting material.

Figure 7:
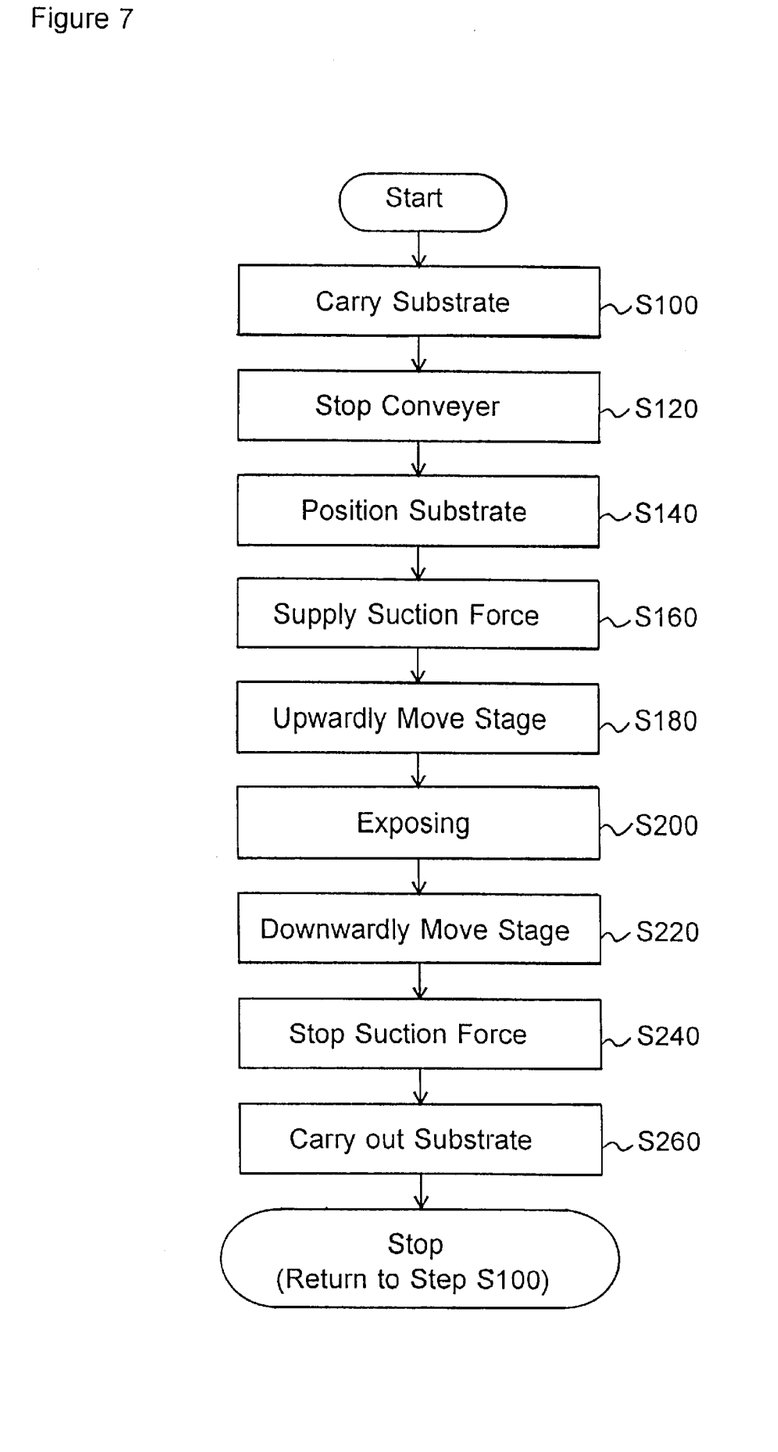
FIG. 7 shows the operational flow of the cleaning process by the cleaning apparatus 100.

Next, the operational flow of the cleaning process by the cleaning apparatus 100 is described. FIG. 7 shows the operational flow of the cleaning process by the cleaning apparatus 100.

The carry in conveyer 40 carries the glass substrate into the chamber 70, (a step S100). When the glass substrate reaches the exposing stage 20, the carry in conveyer 40 is stopped, (a step S120).

Next, the exposing stage 20 is moved in the horizontal direction to position the glass substrate within the predetermined exposing scope, (a step S140), and fixedly holds it by supplying a suction force to it (a step S160).

Next, the exposing stage 20 is upwardly moved in the vertical direction until the glass substrate is positioned at a predetermined exposing distance (a step S180).

At this point of time, the setting or the positioning of the glass substrate for the cleaning is completed. Then, the ultraviolet radiation emission device 10 emits or directs the ultraviolet radiation toward the glass substrate, and the cleaning is performed (a step S200).

The activated oxygen is generated by the action of the ultraviolet radiation to the oxygen atoms in the atmosphere. The organic material on the exposed surface is oxidized by the action of the activated oxygen and is changed to the volatile molecules, so that the organic material deposited on the surface is released and removed. The important feature or concept of the embodiment of the present invention is that the wavelength of the ultraviolet radiation emitted from the ultraviolet radiation emission device 10 is limited to the wavelength equal to or less than 180 nm. As described before, the transparent electrodes, such as the indium oxide, has the characteristic which shuts off the ultraviolet radiation of the wavelength equal to or less than 180 nm and protects the underlying pigment portions from the ultraviolet radiation. Accordingly, if the cleaning process is performed by using the source of ultraviolet radiation having the output radiation of the wavelength equal to or less than 180 nm, the pigment portions can be protected by the transparent electrodes, but the unnecessary organic material can be removed. As a result, the discoloring and the change of the spectral characteristic are not generated in the pigment portions of the color filter, and the ultraviolet radiation can be illuminated or directed onto the unnecessary organic material for a sufficient time period to completely remove them.

When the cleaning process is completed, the exposing stage is moved downwardly to move the glass substrate out of the predetermined exposing distance (a step S220).

Next, the exposing stage 20 stops the supply of the suction force to the glass substrate (a step S240).

Next, the carry out conveyer 50 receives the cleaned glass substrate from the exposing stage 20, and carries it out of the chamber 70 (a step S260).

Next, the process can be returned to the step 100, and the cleaning process for next glass substrate can be started.

During the above series of processing steps, it is necessary to ventilate the atmosphere within the chamber 70 to keep the pressure within the chamber 70 clean.

As described before, the present invention also provides the excellent cleaning method and the cleaning apparatus for cleaning the glass substrate with the color filter.

The present invention also provides the excellent cleaning method and the cleaning apparatus for cleaning the glass substrate with the color filter in which the transparent electrode pattern, such as the ITO (indium tin oxide: an alloy of indium oxide and tin oxide) film or IZO (an alloy of indium oxide and zinc oxide) film, etc., is formed on a pigment pattern.

The present invention also provides the excellent cleaning method and the cleaning apparatus for cleaning the glass substrate with the color filter which can effectively remove the organic contaminant deposited on the ITO film or the IZO film by exposing to the ultraviolet radiation on the ITO film or the IZO film.

While the invention has been particularly shown and described with respect to preferred embodiments thereof, it will be understood by those skilled in the art that the foregoing and other changes in form and details may be made therein without departing form the spirit and scope of the invention.

Having thus described my invention, what I claim as new, and desire to secure by Letters Patent is:

1. A method for cleaning a glass substrate with a color filter including a pattern of transparent electrode formed on a pigment pattern, which comprises exposing said glass substrate to ultraviolet radiation so as to remove an organic contaminant on said glass substrate, said ultraviolet radiation having a wavelength not transmitting through said transparent electrode.

2. The method according to claim 1 wherein, said ultraviolet radiation has a wavelength of 172 nm.

3. The method according to claim 1, wherein said ultraviolet radiation has a wavelength of 180 nm or less.

4. A method for cleaning a glass substrate with a color filter including a pattern of an alloy of indium tin oxide film formed on a pigment pattern, which comprises exposing said glass substrate to ultraviolet radiation so as to remove an organic contaminant on said glass substrate, said ultraviolet radiation having a wavelength not transmitting through said alloy of indium tin oxide film.

5. The method according to claim 4, wherein said ultraviolet radiation has a wavelength of 172 nm.

6. The method according to claim 4, wherein said ultraviolet radiation has a wavelength of 180 nm or less.

7. A method for cleaning a glass substrate with a color filter including a pattern of an alloy of indium zinc oxide film formed on a pigment pattern, which comprises exposing said glass substrate to ultraviolet radiation so as to remove an organic contaminant on said glass substrate, said ultraviolet radiation having a wavelength not transmitting through said alloy of indium zinc oxide film.

8. The method according to claim 7, wherein said ultraviolet radiation has a wavelength of 172 nm.

9. The method according to claim 7, wherein said ultraviole radiation has a wavelength of 180 nm or less.

10. An apparatus for cleaning a glass substrate with a color filter including a pattern of transparent electrode formed on a pigment pattern, comprising:
   a chamber for maintaining a predetermined atmosphere;
   a supporting structure for holding said glass substrate thereon;
   a light source for emitting ultraviolet radiation having a wavelength not transmitting through said transparent electrode; and
   an ozone filter and an ozone sensor for disposing of ozone which is generated during the emission of said ultraviolet radiation.

11. The apparatus according to claim 10, wherein said light source emits ultraviolet radiation having a wavelength of 172 nm.

12. The apparatus according to claim 10, wherein said light source emits ultraviolet radiation having a wavelength of 180 nm or less.

13. The apparatus according to claim 10, wherein said supporting structure includes a horizontal movement mechanism for positioning said glass substrate in a horizontal direction and an up/down mechanism for alligning to expose said glass substrate to said ultraviolet radiation.

14. The apparatus according to claim 10, wherein said apparatus further includes a carry in conveyer for carrying said glass substrate into said chamber and a carry out conveyer for carrying said glass substrate out of said chamber.

15. An apparatus for cleaning a substrate, comprising;

a chamber for maintaining a predetermined atmosphere;

a supporting structure for holding said substrate thereon;

a light source for emitting ultraviolet radiation having a wavelength of 180 nm or less; and an ozone filter and an ozone sensor for disposing of ozone which is generated during the emission of said ultraviolet radiation.

* * * * *